United States Patent
Kim et al.

(10) Patent No.: US 11,767,230 B2
(45) Date of Patent: Sep. 26, 2023

(54) POSITIVE ELECTRODE ACTIVE MATERIAL PRECURSOR, PREPARATION METHOD THEREOF, POSITIVE ELECTRODE ACTIVE MATERIAL PREPARED USING SAME, POSITIVE ELECTRODE, AND SECONDARY BATTERY

(71) Applicant: LG Chem, Ltd., Seoul (KR)

(72) Inventors: Dong Hwi Kim, Daejeon (KR); Wang Mo Jung, Daejeon (KR); Dong Hun Lee, Daejeon (KR); Sung Bin Park, Daejeon (KR); Ji Hye Kim, Daejeon (KR); Hyung Man Cho, Daejeon (KR); Jung Min Han, Daejeon (KR)

(73) Assignee: LG Energy Solution, Ltd.

( * ) Notice: Subject to any disclaimer, the term of this patent is extended or adjusted under 35 U.S.C. 154(b) by 453 days.

(21) Appl. No.: 16/762,721

(22) PCT Filed: Nov. 21, 2018

(86) PCT No.: PCT/KR2018/014375
§ 371 (c)(1),
(2) Date: May 8, 2020

(87) PCT Pub. No.: WO2019/103461
PCT Pub. Date: May 31, 2019

(65) Prior Publication Data
US 2021/0135195 A1 May 6, 2021

(30) Foreign Application Priority Data
Nov. 21, 2017 (KR) .................. 10-2017-0155469

(51) Int. Cl.
*H01B 1/08* (2006.01)
*H01M 4/00* (2006.01)
(Continued)

(52) U.S. Cl.
CPC ........... *C01G 53/006* (2013.01); *C01G 53/04* (2013.01); *H01B 1/08* (2013.01); *H01M 2004/028* (2013.01)

(58) Field of Classification Search
CPC .......... H01B 1/00; H01B 1/08; C01G 53/006; C01G 53/04; H01M 4/058
See application file for complete search history.

(56) References Cited

U.S. PATENT DOCUMENTS 5,508,121 A * 4/1996 Sawa ...................... H01M 4/52
429/223
6,251,538 B1 * 6/2001 Seyama ................ C01G 53/04
429/223

(Continued)

FOREIGN PATENT DOCUMENTS

CN 1672275 A 9/2005
CN 101154726 A 4/2008
(Continued)

OTHER PUBLICATIONS

Camardese et al "Synthesis of spherical core-shell Ni(OH)2—Ni1/2Mn1/2(OH)2 particles via a continuously stirred tank reactor", Journal of the Electrochemical Society, 161 (6) A890-A895 (2014).*

(Continued)

*Primary Examiner* — Mark Kopec
(74) *Attorney, Agent, or Firm* — Lerner David LLP

(57) ABSTRACT

A positive electrode active material precursor is provided, which includes a transition metal hydroxide particle represented by Formula 1 and a cobalt oxide particle and a manganese oxide particle attached to the surface of the transition metal hydroxide particle. A preparation method thereof, a positive electrode active material prepared using the same, a positive electrode including the positive elec- (Continued)

trode active material, and a secondary battery including the positive electrode are also provided.

5 Claims, 3 Drawing Sheets

(51) Int. Cl.
*C01G 53/00* (2006.01)
*C01G 53/04* (2006.01)
*H01M 4/02* (2006.01)

(56) References Cited

U.S. PATENT DOCUMENTS

| | | | | |
|---|---|---|---|---|
| 6,800,396 | B1* | 10/2004 | Stoller | H01M 4/52 |
| | | | | 429/223 |
| 7,335,445 | B2* | 2/2008 | Sakamoto | H01M 4/38 |
| | | | | 429/223 |
| 10,601,036 | B2* | 3/2020 | Aida | C01G 51/006 |
| 11,031,593 | B2* | 6/2021 | Choi | H01B 1/08 |
| 2003/0104277 | A1 | 6/2003 | Tokuda et al. | |
| 2005/0265909 | A1 | 12/2005 | Kajiya et al. | |
| 2010/0316910 | A1 | 12/2010 | Kajiyama et al. | |
| 2012/0028114 | A1 | 2/2012 | Huang et al. | |
| 2012/0168696 | A1 | 7/2012 | Huang et al. | |
| 2012/0171570 | A1 | 7/2012 | Huang et al. | |
| 2014/0087261 | A1 | 3/2014 | Li et al. | |
| 2014/0106228 | A1* | 4/2014 | Toya | H01M 10/0585 |
| | | | | 429/223 |
| 2014/0186710 | A1* | 7/2014 | Ryoshi | C01D 15/02 |
| | | | | 429/223 |
| 2014/0205898 | A1 | 7/2014 | Lee et al. | |
| 2015/0171423 | A1 | 6/2015 | Kim et al. | |
| 2015/0280225 | A1 | 10/2015 | Lee et al. | |
| 2015/0349339 | A1 | 12/2015 | Cho et al. | |
| 2015/0364761 | A1 | 12/2015 | Fukui et al. | |
| 2017/0207444 | A1* | 7/2017 | Yanagihara | H01M 4/505 |
| 2018/0013129 | A1 | 1/2018 | Lee et al. | |
| 2018/0048015 | A1 | 2/2018 | Lee et al. | |
| 2018/0108940 | A1 | 4/2018 | Kwon et al. | |
| 2018/0294477 | A1 | 10/2018 | Shin et al. | |

FOREIGN PATENT DOCUMENTS

| | | | |
|---|---|---|---|
| CN | 102969494 | A | 3/2013 |
| CN | 103700833 | A | 4/2014 |
| CN | 104064743 | A | 9/2014 |
| CN | 104737334 | A | 6/2015 |
| CN | 105244490 | A | 1/2016 |
| CN | 106044871 | A | 10/2016 |
| EP | 2720305 | A1 | 4/2014 |
| JP | 2001351629 | A | 12/2001 |
| JP | 2003092106 | A | 3/2003 |
| JP | 2010114088 | A | 5/2010 |
| JP | 2010192424 | A | 9/2010 |
| JP | 2014040363 | A | 3/2014 |
| KR | 20060035547 | A | 4/2006 |
| KR | 20140084566 | A | 7/2014 |
| KR | 20140084567 | A | 7/2014 |
| KR | 20140116078 | A | 10/2014 |
| KR | 20150070853 | A | 6/2015 |
| KR | 20160040016 | A | 4/2016 |
| KR | 20160063982 | A | 6/2016 |
| KR | 20160129764 | A | 11/2016 |
| KR | 20160149162 | A | 12/2016 |
| KR | 20170038485 | A | 4/2017 |
| KR | 20170063396 | A | 6/2017 |
| KR | 20170075915 | A | 7/2017 |
| KR | 20170096673 | A | 8/2017 |
| KR | 20170108184 | A | 9/2017 |
| WO | 2016204563 | A1 | 12/2016 |

OTHER PUBLICATIONS

Wang et al. "Mn3O4/Ni(OH)2 nanocomposite as an applicable electrode material for pseudocapacitors", Electrochemica Acta 249 (2017) 155-165.*
International Search Report from Application No. PCT/KR2018/014375 dated Apr. 22, 2019, 2 pages.
Search Report dated Jan. 27, 2022 from the Office Action for Chinese Application No. 2018800716588 dated Feb. 7, 2022, 3 pgs.
European Search Report for Application No. EP 18881261, dated Nov. 23, 2020, 8 pages.
Search Report dated Oct. 28, 22 from the Office Action for Chinese Application No. 2018800716588 dated Nov. 3, 2022. 3 pgs.

* cited by examiner

POSITIVE ELECTRODE ACTIVE MATERIAL PRECURSOR, PREPARATION METHOD THEREOF, POSITIVE ELECTRODE ACTIVE MATERIAL PREPARED USING SAME, POSITIVE ELECTRODE, AND SECONDARY BATTERY

CROSS-REFERENCE TO RELATED APPLICATIONS

The present application is a national stage entry under 35 U.S.C. § 371 of PCT/KR2018/014375 filed on Nov. 21, 2018, which claims priority to 10-2017-0155469, filed on Nov. 21, 2017, in the Korean Intellectual Property Office, the disclosures of which are incorporated herein in their entirety by reference.

TECHNICAL FIELD

The present invention relates to a positive electrode active material precursor and a method for preparing the same, and more specifically, to a positive electrode active material precursor for preparing a Ni-rich positive electrode active material excellent in electrochemical properties and thermal stability.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal composite oxide is used. Among such lithium transition metal composite oxides, a lithium cobalt composite metal oxide which has a high functional voltage and excellent capacity properties such as $LiCoO_2$ has been mainly used. However, $LiCoO_2$ has very poor thermal properties due to the destabilization of crystal structure according to de-lithium, and is expensive. Therefore, $LiCoO_2$ has a limitation in being used as a power source for an electric vehicle or the like in a large amount.

As a material to replace $LiCoO_2$, a lithium manganese composite metal oxide ($LiMnO_2$. or $LiMn_2O_4$, and the like), a lithium iron phosphate compound ($LiFePO_4$, and the like), or a lithium nickel composite metal oxide ($LiNiO_2$, and the like) has been developed. Among these materials, research and development has been actively conducted on a lithium nickel composite metal oxide which has a high reversible capacity of about 200 mAh/g to easily implement a high capacity battery. However, when compared with $LiCoO_2$, $LiNiO_2$ has poor thermal stability. Furthermore, $LiNiO_2$ has a problem in that when an internal short circuit occurs due to external pressure or the like in a charged state, a positive electrode active material itself is decomposed, causing the rupture and ignition of a battery.

Therefore, as a method for improving the thermal stability of LiNiO2 while maintaining the excellent reversible capacity thereof, a nickel cobalt manganese-based lithium composite metal oxide in which a part of Ni is substituted with Mn and Co (hereinafter, simply referred to as 'NCM-based lithium oxide') has been developed. However, conventional NCM-based lithium oxides developed up to the present have no sufficient capacity so that there has been a limitation in the application thereof.

In order to solve such limitations, studies have recently been made to increase the content of Ni in a NCM-based lithium oxide. However, a Ni-rich positive electrode active material having a high content of nickel has a problem in that the structural stability and chemical stability of the active material is deteriorated. In addition, as the content of nickel in the active material increases, the residual amount of lithium by-products present on the surface of the positive electrode active material in the form of LiOH and $Li_2CO_3$ is increased so that gas is generated and swelling occurs, causing another problem of the deterioration of the lifespan and the stability of a battery.

In order to solve such problems, a positive electrode active material having a concentration gradient in which the content of Ni in the positive electrode active material gradually decreases is provided. The positive electrode active material having a concentration gradient as described above is prepared by mixing a first metal solution having a high nickel content and a second metal solution having a low nickel content while adjusting the mixing ratio thereof so as to prepare a precursor in which the nickel content is high in the central portion but gradually decreases toward the surface and mixing the precursor with a lithium raw material such as lithium hydroxide or lithium carbonate, followed by firing. However, in the positive electrode active material having a concentration gradient as described above, since the nickel content gradually decreases, there is a limitation in increasing the nickel content in the entire positive electrode active material, thereby having a limitation in increasing capacity. Furthermore, in order to maintain the concentration gradient, firing should be performed at a low temperature, so that thermal stability is lowered. In addition, since the preparation should be performed by mixing two kinds of metal solutions, it is difficult to control the pH in a reactor, so that the quality control of a precursor is also difficult and a process is complex.

Therefore, there has been a demand for developing a Ni-rich positive electrode active material which is in conformity with high capacity and excellent in thermal stability.

PRIOR ART DOCUMENT

Korean Patent Laid-open Publication No. 10-2016-0063982 (Date of publication: Jun. 7, 2016)

DISCLOSURE OF THE INVENTION

Technical Problem

In order to solve the above problems, an aspect of the present invention provides a positive electrode active material precursor capable of forming a Ni-rich positive electrode active material having excellent thermal stability, and a preparation method thereof.

Another aspect of the present invention provides a positive electrode active material prepared using the positive electrode active material precursor, a positive electrode for a secondary battery including the positive electrode active material, and a secondary battery including the positive electrode.

Technical Solution

According to an aspect of the present invention, there is provided a positive electrode active material precursor including a transition metal hydroxide particle represented by Formula 1 below, and a cobalt oxide particle and a manganese oxide particle attached to the surface of the transition metal hydroxide particle.

$$[Ni_aCo_bM^1_cM^2_d](OH)_2 \quad \text{[Formula 1]}$$

In Formula 1, $0.8 \leq a < 1$, $0 < b < 0.2$, $0 \leq c \leq 0.1$, and $0 \leq d \leq 0.1$, $M^1$ is one or more selected from the group consisting of Mn and Al, and $M^2$ is one or more selected from the group consisting of Ba, Ca, Zr, Ti, Mg, Ta, Nb, and Mo.

According to another aspect of the present invention, there is provided a method for preparing a positive electrode active material precursor, the method including forming a transition metal hydroxide particle represented by [Formula 1] below by adding an ammonium-containing complex forming agent and a basic compound to a metal solution containing a nickel raw material and a cobalt raw material to cause a co-precipitation reaction, and adding a cobalt oxide particle and a manganese oxide particle into a reaction solution in which the transition metal hydroxide particle is formed so as to attach the cobalt oxide particle and the manganese oxide particle to the surface of the transition metal hydroxide particle.

$$[Ni_aCo_bM^1_cM^2_d](OH)_2 \quad \text{[Formula 1]}$$

In Formula 1, $0.8 \leq a < 1$, $0 < b < 0.2$, $0 \leq c \leq 0.1$, and $0 \leq d \leq 0.1$, $M^1$ is one or more selected from the group consisting of Mn and Al, and $M^2$ is one or more selected from the group consisting of Ba, Ca, Zr, Ti, Mg, Ta, Nb, and Mo.

According to yet another aspect of the present invention, there is provided a positive electrode active material including a core portion composed of a lithium composite transition metal oxide particle represented by Formula 2 below, and a shell portion formed on the core portion, wherein the molar fractions of Ni and Co elements in the core portion are constant, and the molar fractions of Co and Mn in the shell portion are higher than the molar fractions of Co and Mn in the core portion.

$$Li_x[Ni_{a'}Co_{b'}M^1_{c'}M^2_{d'}]O_{2-y}X_y \quad \text{[Formula 2]}$$

In Formula 2, $0.8 \leq a' < 1$, $0 < b' < 0.2$, $0 < c' \leq 0.1$, $0 \leq d' \leq 0.1$, $1.0 \leq x \leq 1.5$, and $0 \leq y \leq 0.2$, $M^1$ is one or more selected from the group consisting of Mn and Al, $M^2$ is one or more selected from the group consisting of Ba, Ca, Zr, Ti, Mg, Ta, Nb, and Mo, and X is P or F.

According to yet an aspect of the present invention, there is provided a positive electrode for a secondary battery, the positive electrode including the positive electrode active material of the present invention, and a lithium secondary battery including the positive electrode.

Advantageous Effects

A positive electrode active material precursor according to the present invention is in the form in which a manganese oxide particle and a cobalt oxide particle are attached to the surface of a transition metal hydroxide particle having a constant transition metal concentration. When a positive electrode active material is prepared by mixing and then firing the positive electrode active material precursor and a lithium raw material, a positive electrode active material having the content of manganese and cobalt in a surface portion higher than the content of manganese and cobalt inside the active material and having the content of nickel in the surface portion lower than the content of nickel inside the active material is prepared, so that thermal stability and electrochemical properties are excellent.

Also, the positive electrode active material precursor according to the present invention may maintain a higher nickel content than a positive electrode active material precursor having a concentration gradient, thereby having excellent capacity properties, and may be fired at relatively high temperatures, thereby having excellent thermal stability.

BEST MODE FOR CARRYING OUT THE INVENTION

Figure 1:
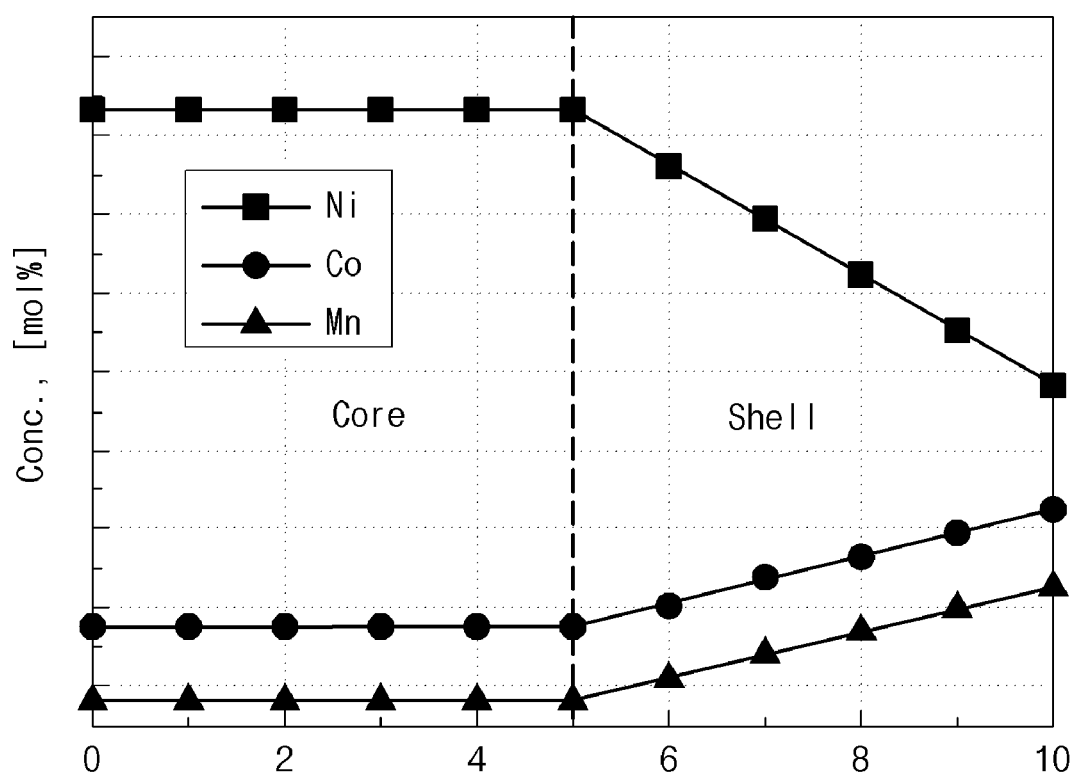
FIG. 1 is a graph showing the composition of a positive electrode active material prepared by Example 1.

Hereinafter, the present invention will be described in more detail.

The present inventors have repeatedly conducted studies in order to prepare a highly-concentrated nickel-based positive electrode active material having excellent thermal stability. As a result, the present inventors have found that by further adding a cobalt oxide particle and a manganese oxide particle when preparing a precursor, a precursor having the cobalt oxide particle and the manganese oxide particle attached to the surface thereof is prepared, and by using the precursor when preparing a positive electrode active material, it is possible to improve the thermal stability of a Ni-rich positive electrode active material, and the inventors have completed the present invention.

Preparation Method of Positive Electrode Active Material Precursor

First, a method for preparing a positive electrode active material precursor according to the present invention will be described.

The method for preparing a positive electrode active material precursor according to the present invention includes (1) forming a transition metal hydroxide particle represented by [Formula 1] below, and (2) adding a cobalt oxide particle and a manganese oxide particle to attach the cobalt oxide particle and the manganese oxide particle to the surface of the transition metal hydroxide particle. Hereinafter, each step will be described in detail.

(1) Preparing Transition Metal Hydroxide Particle

First, an ammonium-containing complex forming agent and a basic compound are added to a metal solution containing a nickel-containing raw material and a cobalt-containing raw material to cause a co-precipitation reaction.

The nickel-containing raw material may be, for example, an acetate, a nitrate, a sulfate, a halide, a sulfide, a hydroxide, an oxide, or an oxyhydroxide, and the like, all containing nickel, specifically $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but is not limited thereto.

The cobalt-containing raw material may be, for example, an acetate, a nitrate, a sulfate, a halide, a sulfide, a hydroxide, an oxide, or an oxyhydroxide, and the like, all containing cobalt, specifically $Co(OH)_2$, $CoOOH$, Co(OCOCH$_3$)$_2$·4H$_2$O, CO(NO$_3$)$_2$·6H$_2$O, Co(SO$_4$)$_2$·7H$_2$O, or a combination thereof, but is not limited thereto.

Meanwhile, if necessary, the metal solution may further include an M$^1$-containing raw material and/or an M$^2$-containing raw material.

In the M$^1$-containing raw material, M$^1$ may be one or more of aluminum and manganese, and the M$^1$-containing raw material may be an acetate, a nitrate, a sulfate, a halide, a sulfide, a hydroxide, an oxide, or an oxyhydroxide, and the like, all containing an M$^1$ element. Specifically, the M$^1$-containing raw material may be a manganese oxide such as Mn$_2$O$_3$, MnO$_2$, and Mn$_3$O$_4$; a manganese salt such as MnCO$_3$, Mn(NO$_3$)$_2$, MnSO$_4$, a manganese acetate, a manganese dicarboxylate, a manganese citrate, and a manganese fatty acid; a manganese oxyhydroxide, a manganese chloride; Al$_2$O$_3$, AlSO$_4$, AlCl$_3$, Al-isopropoxide, AlNO$_3$, or a combination thereof, but is not limited thereto.

In the M$^2$-containing raw material, an M$^2$ element may be one or more selected from the group consisting of Ba, Ca, Zr, Ti, Mg, Ta, Nb, and Mo, and the M$^2$-containing raw material may be an acetate, a nitrate, a sulfate, a halide, a sulfide, a hydroxide, an oxide, or an oxyhydroxide, and the like, all containing the M$^2$ element.

The metal solution may be prepared by adding a nickel-containing raw material, a cobalt-containing raw material, and selectively an M$^1$-containing raw material and/or an M$^2$-containing raw material to a solvent, specifically water, or a mixed solvent of water and an organic solvent (for example, alcohol, etc.) which can be uniformly mixed with water. Alternatively, the metal solution may be prepared by mixing an aqueous solution of a nickel-containing raw material, an aqueous solution of a cobalt-containing raw material, an aqueous solution of an M$^1$-containing raw material, and an aqueous solution of an M$^2$-containing raw material. At this time, the nickel-containing raw material, the cobalt-containing raw material, the M$^1$-containing raw material, and the M$^2$-containing raw material may be mixed with a stoichiometric ratio that may satisfy the molar ratio of each element, such as, nickel, cobalt, M$^1$, and M$^2$, in a transition metal hydroxide particle formed by a co-precipitation reaction. That is, in the present invention, the nickel-containing raw material, the cobalt-containing raw material, the M$^1$-containing raw material, and the M$^2$-containing raw material are mixed in an amount that may satisfy the molar fractions of a, b, c and d in [Formula 1], which will be described later.

Meanwhile, the ammonium-containing complex forming agent may be, for example, NH$_4$OH, (NH$_4$)$_2$SO$_4$, NH$_4$NO$_3$, NH$_4$Cl, CH$_3$COONH$_4$, NH$_4$CO$_3$, or a combination thereof, but is not limited thereto. Meanwhile, the ammonium-containing complex forming agent may be used in the form of an aqueous solution. At this time, as a solvent, water, or a mixture of an organic solvent (for example, alcohol, etc.) which may be uniformly mixed with water and water may be used.

The ammonium-containing complex forming agent may be preferably added in an amount of 1.0 M to 2.0 M, more preferably 1.0 M to 1.3 M.

The basic compound may be a hydroxide of an alkali metal or an alkaline earth metal such as NaOH, KOH or Ca(OH)$_2$, a hydrate thereof, or a combination thereof. The basic compound may also be used in the form of an aqueous solution. At this time, as a solvent, water, or a mixture of an organic solvent (for example, alcohol, etc.) which may be uniformly mixed with water and water may be used.

The basic compound is added to control the pH of a reaction solution, and may be added in an amount such that the pH of a metal solution is 11 to 13.

Meanwhile, the co-precipitation reaction may be performed in an inert atmosphere, such as in a nitrogen atmosphere or in an argon atmosphere and the like, at a temperature of 40° C. to 70° C. In addition, in order to increase the reaction rate during the reaction, a stirring process may be selectively performed. At this time, the stirring rate may be 100 rpm to 2000 rpm.

Through the above process, a transition metal hydroxide particle represented by [Formula 1] below is formed, and precipitated in a reaction solution.

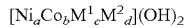 [Formula 1]

In Formula 1, M$^1$ is one or more selected from the group consisting of Mn and Al, and M$^2$ is one or more selected from the group consisting of Ba, Ca, Zr, Ti, Mg, Ta, Nb, and Mo.

Meanwhile, the a, b, c, and d respectively represent the molar ratio of nickel, cobalt, M$^1$ and M$_2$, and may satisfy the relation of 0.8≤a<1, 0<b<0.2, 0≤c≤0.1, and 0≤d≤0.1, preferably, 0.8≤a≤0.95, 0.01≤b≤0.15, 0.01≤c≤0.1, and 0≤d≤10.1.

(2) Adding Cobalt Oxide Particle and Manganese Oxide Particle

When the transition metal hydroxide particle represented by [Formula 1] is formed in the reaction solution through the process described above, a cobalt oxide particle and a manganese oxide particle are added thereto.

At this time, as the cobalt oxide particle, a cobalt oxide particle such as Co$_3$O$_4$ may be used, and as the manganese oxide particle, a manganese oxide particle such as Mn$_2$O$_3$, MnO$_2$, Mn$_3$O$_4$, and the like may be used.

Meanwhile the cobalt oxide particle and the manganese oxide particle may respectively have an average particle diameter (D$_{50}$) of 10-500 nm, preferably 100-300 nm. When the average particle diameter of the cobalt oxide particle and the manganese oxide particle satisfies the above range, the cobalt oxide particle and the manganese oxide particle may be uniformly attached to the surface of the transition metal hydroxide particle.

Meanwhile, the introduction amount of the cobalt oxide particle and the manganese oxide particle may be appropriately adjusted in consideration of the cobalt content and the manganese content in a precursor to be finally prepared. For example, the cobalt oxide particle may be added in an amount such that the cobalt content in a precursor to be formed is 10-18000 ppm, preferably 1000-10000 ppm, more preferably 3000-6000 ppm. The manganese oxide particle may be added in an amount such that the manganese content in a precursor to be finally formed is 10-12000 ppm, preferably 1000-10000 ppm, more preferably 3000-6000 ppm.

Also, it is preferable that the cobalt oxide particle and the manganese oxide particle are added such that cobalt is contained in a precursor to be finally prepared in a higher content than manganese. When the content of cobalt is higher than the content of manganese, rate properties, cycle properties, and lifespan properties are more excellent. Specifically, the cobalt-containing particle and the manganese-containing particle may be added such that the weight ratio of cobalt:manganese in a precursor to be finally prepared is 6:4 to 8:2.

Meanwhile, it is preferable that the cobalt oxide particle and the manganese oxide particle are added when the growth of the transition metal hydroxide particle has been achieved above a predetermined level. When the cobalt-containing particle and the manganese-containing particle are added prematurely, the content of nickel is reduced in the entire precursor, so that the capacity properties may be deteriorated when preparing an active material. Specifically, when the average particle diameter ($D_{50}$) of a positive electrode active material precursor to be finally obtained is 100%, it is preferable that the cobalt oxide particle and the manganese oxide particle are added when the average particle diameter ($D_{50}$) of the transition metal hydroxide particle formed in the reaction solution is 60% or greater, preferably 80% to 90%.

After adding the cobalt oxide particle and the manganese oxide particle as described above, the reaction solution is stirred for 1 to 4 hours to further proceed the reaction such that the cobalt oxide particle and the manganese oxide particle are evenly attached to the surface of a transition metal hydroxide.

Through the reaction, prepared is a positive electrode active material precursor having a cobalt oxide particle and a manganese oxide particle attached to the surface of a transition metal hydroxide particle represented by [Formula 1] above.

Thereafter, the positive electrode active material precursor prepared by a method as described above is separated from the reaction solution, and then dried to obtain a positive electrode active material precursor. At this time, the drying process may be performed for 15 hours to 30 hours at 110° C. to 400° C.

Positive Electrode Active Material Precursor

Thereafter, a positive electrode active material precursor according to the present invention will be described.

The positive electrode active material precursor according to the present invention is prepared by the method for preparing a positive electrode active material precursor described above, and includes a transition metal hydroxide particle represented by Formula 1 below, and a cobalt oxide particle and a manganese oxide particle attached to the surface of the transition metal hydroxide particle.

$$[Ni_aCo_bM^1_cM^2_d](OH)_2 \quad \text{[Formula 1]}$$

In Formula 1, $M^1$ is one or more selected from the group consisting of Mn and Al, and $M^2$ is one or more selected from the group consisting of Ba, Ca, Zr, Ti, Mg, Ta, Nb, and Mo.

Meanwhile, the a represents the molar fraction of nickel in a transition metal hydroxide particle, and may satisfy the relation of $0.8 \leq a < 1$, preferably $0.8 \leq a \leq 0.95$.

The b represents the molar fraction of cobalt in a transition metal hydroxide particle, and may satisfy the relation of $0 < b < 0.2$, preferably $0.01 \leq b \leq 0.15$.

The c represents the molar fraction of an $M^1$ element in a transition metal hydroxide particle, and may satisfy the relation of $0 \leq c \leq 0.1$, preferably $0.01 \leq c \leq 0.1$.

The d represents the molar fraction of an $M^2$ element in a transition metal hydroxide particle, and may satisfy the relation of $0 \leq d \leq 0.1$, preferably $0 \leq d \leq 0.05$.

When the transition metal hydroxide particle satisfies the above range, excellent capacity properties may be exhibited.

Meanwhile, the transition metal hydroxide particle does not have a concentration gradient since the concentration (molar ratio) of nickel and cobalt remains constant in the particle. Accordingly, the content of nickel contained in the entire precursor is high, so that the capacity properties are excellent. Furthermore, when compared with a precursor having a concentration gradient, firing may be performed at a relatively high temperature, so that high thermal stability may be achieved after preparing an active material.

Meanwhile, the cobalt oxide particle may be, for example, a cobalt oxide particle such as $Co_3O_4$, and the manganese oxide particle may be, for example, a manganese oxide particle such as $Mn_2O_3$, $MnO_2$, $Mn_3O_4$, and the like. Meanwhile, the positive electrode active material precursor may include cobalt in an amount of 10-18000 ppm, preferably 1000-10000 ppm, more preferably 3000-6000 ppm, and may include manganese in an amount of 10-12000 ppm, preferably 1000-10000 ppm, more preferably 3000-6000 ppm, both based on the total weight of the positive electrode active material precursor. When the content of nickel and cobalt in a positive electrode active material precursor satisfies the above range, capacity properties and thermal stability are all excellent.

More preferably, it is desirable that the positive electrode active material precursor contains cobalt in a higher content than manganese. Specifically, it is desirable that the weight ratio of cobalt:manganese is 6:4 to 8:2. When the weight ratio of cobalt and manganese satisfies the above range, rate properties, cycle properties, and lifespan properties are more excellent.

The cobalt oxide particle and the manganese oxide particle attached to the surface of the transition metal hydroxide react with a lithium raw material before nickel in a firing process to be described later, and as a result, the content of cobalt and manganese in a surface portion of a positive electrode active material is increased. As the content of cobalt and manganese is increased in the surface portion of the positive electrode active material, the content of nickel is decreased relatively, and as a result, the structural stability of the positive electrode active material is improved, thereby improving the thermal properties and electrochemical properties.

Positive Electrode Active Material

Next, a positive electrode active material according to the present invention will be described.

The positive electrode active material according to the present invention is prepared using the positive electrode active material precursor of the present invention described above, and specifically, may be prepared by mixing and then firing the positive electrode active material precursor of the present invention and a lithium-containing raw material. The positive electrode active material according to the present invention may be prepared by a method known in the art for preparing a positive electrode active material except that the positive electrode active material precursor according to the present invention is used. However, the method is not particularly limited. Detailed contents of the positive electrode active material precursor of the present invention are the same as those described above, and thus, a detailed description thereof will be omitted.

The lithium-containing raw material may be a carbonate (for example, lithium carbonate and the like), a hydrate (for example, lithium hydroxide hydrate ($LiOH \cdot H_2O$) and the like), a hydroxide (for example, lithium hydroxide and the like), a nitrate (such as lithium nitrate ($LiNO_3$) and the like) and a chloride (such as lithium chloride (LiCl) and the like), and the like, all containing lithium, and any one thereof or a mixture of two or more thereof may be used.

Meanwhile, the mixing of a positive electrode active material precursor and a lithium-containing raw material may be performed by solid state mixing such as jet milling, and the mixing ratio of the positive electrode active material precursor and the lithium-containing raw material may be determined to be in a range satisfying the molar fraction of each component in a positive electrode active material to be finally prepared.

Meanwhile, although not required, during the mixing, additional raw materials to dope a portion of a transition metal and/or oxygen of the positive electrode active material may be further included. For example, during the mixing, the $M^1$-containing raw material and/or the $M^2$-containing raw material, an X-containing raw material to be described later may be additionally mixed. At this time, the X-containing raw material may be, for example, $Na_3PO_4$, $K_3PO_4$, $Mg_3(PO_4)_2$, $AlF_3$, $NH_4F$, LiF, and the like, but is not limited thereto. When a portion of oxygen is substituted by an X element as described above, there is an effect of suppressing the de-intercalation of oxygen and a reaction with an electrolyte during charging/discharging of a secondary battery.

Meanwhile, the firing may be performed at 700° C. to 900° C., preferably 750° C. to 850° C., and may be performed for 5-30 hours, preferably 8-15 hours, but the temperature and the duration of the firing are not limited thereto.

Meanwhile, after the firing, in order to remove lithium by-products, a step of rinsing with water and drying may be further performed. The step of rinsing with water may be performed by, for example, adding a lithium composite metal oxide into pure water, and then stirring the same. At this time, the temperature for the rinsing with water may be 20° C. or less, preferably 10° C. to 20° C., and the duration for the rinsing with water may be 10 minutes to 1 hour. When the temperature and duration for the rinsing with water satisfy the above ranges, lithium by-products may be effectively removed.

The positive electrode active material according to the present invention prepared as described above includes a core portion composed of a lithium composite transition metal oxide particle represented by Formula 2 below, and a shell portion formed on the core portion, wherein the molar fractions of Ni and Co elements in the core portion are constant, and the molar fractions of Co and Mn in the shell portion are higher than the molar fractions of Co and Mn in the core portion.

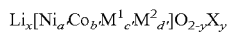

$$Li_x[Ni_{a'}Co_{b'}M^1_{c'}M^2_{d'}]O_{2-y}X_y \qquad \text{[Formula 2]}$$

In Formula 2, $M^1$ is one or more selected from the group consisting of Mn and Al, $M^2$ is one or more selected from the group consisting of Ba, Ca, Zr, Ti, Mg, Ta, Nb, and Mo, and X may be P or F.

The a' represents the molar fraction of nickel in a lithium composite transition metal oxide particle, and may satisfy the relation of $0.8 \le a' < 1$, preferably $0.8 \le a' \le 0.95$.

The b' represents the molar fraction of cobalt in a lithium composite transition metal oxide particle, and may satisfy the relation of $0 < b' < 0.2$, preferably $0.01 \le b' \le 0.15$.

The c' represents the molar fraction of an $M^1$ element in a lithium composite transition metal oxide particle, and may satisfy the relation of $0 < c' \le 0.1$, preferably $0.01 \le c' \le 0.1$.

The d' represents the molar fraction of an $M^2$ element in a lithium composite transition metal particle, and may satisfy the relation of $0 \le d' \le 0.1$, preferably $0 \le d' \le 0.05$.

The x represents the molar fraction of lithium in a lithium composite transition metal oxide particle, and may be the relation of $1.0 \le x \le 1.5$, preferably $1.0 \le x \le 1.2$, more preferably $1.0 \le x \le 1.1$.

The y represents the molar fraction of an X element in a lithium composite transition metal oxide particle, and may satisfy the relation of $0 \le y \le 0.2$, preferably $0 \le y \le 0.1$.

The positive electrode active material according to the present invention is prepared by mixing a precursor having a cobalt oxide particle and a manganese oxide particle attached to the surface thereof with a lithium-containing raw material, followed by firing. Therefore, during the firing, the cobalt oxide particle and the manganese oxide particle attached to the surface reacts with lithium first to form a shell portion having a content of cobalt and manganese higher than that of a core portion, and thus, the content of nickel in the shell portion is reduced, thereby improving high-temperature stability.

Also, in the positive electrode active material according to the present invention, the molar fraction of nickel in the core portion is 80 mol % or greater and is high, and the molar fractions of Ni and Co elements in the core portion are constant, thereby exhibiting high capacity properties.

Positive Electrode and Secondary Battery

The positive electrode active material for a secondary battery according to the present invention may be usefully used in manufacturing a positive electrode for a secondary battery.

Specifically, a positive electrode for a secondary battery according to the present invention includes a positive electrode current collector, and a positive electrode active material layer formed on the positive electrode current collector. At this time, the positive electrode active material layer includes the positive electrode active material according to the present invention.

The positive electrode may be manufactured according to a typical manufacturing method of a positive electrode except that the positive electrode active material according to the present invention is used. For example, the positive electrode may be manufactured by manufacturing a positive electrode mixture by dissolving or dispersing components constituting a positive electrode active material layer, which are a positive electrode active material, a conductive agent and/or a binder, in a solvent, applying the mixture on at least one surface of a positive electrode current collector, followed by drying and then roll-pressing. Alternatively, the positive electrode may be manufactured by casting the positive electrode mixture on a separate support, and then laminating a film peeled off from the support on the positive electrode current collector.

At this time, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of a positive electrode active material. For example, the positive electrode current collector may be used in various forms such as a film, a sheet, a foil, a net, a porous body, a foam, and a non-woven body.

On at least one surface of the current collector, a positive electrode active material layer including the positive electrode active material according to the present invention, and when necessary, further including at least one of a conductive material or a binder optionally is disposed.

The positive electrode active material includes the positive electrode active material according to the present invention, that is, a lithium composite metal oxide represented by Formula 1 above and a cobalt-rich layer formed on the lithium composite metal oxide. Detailed contents of the positive electrode active material according to the present invention are the same as those described above, and thus, a detailed description thereof will be omitted.

The positive electrode active material may be included in an amount of 80-99 wt %, more specifically 85-98 wt % based on the total weight of the positive electrode active material layer. When the positive electrode active material is included in the above content range, excellent capacity properties may be exhibited.

The conductive material is used to impart conductivity to an electrode, and any conductive agent may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

Also, the binder serves to improve the bonding between positive electrode active material particles and the adhesion between the positive electrode active material and the current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

Meanwhile, the solvent used in preparing the positive electrode mixture may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, etc. of a slurry.

Next, a secondary battery according to the present invention will be described.

The secondary battery according to the present invention includes a positive electrode, a negative electrode disposed to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical manufacturing method of a negative electrode known in the art. For example, the negative electrode may be manufactured by preparing a negative electrode mixture by dissolving or dispersing components constituting a negative electrode active material layer, i.e., a negative electrode active material, a conductive agent and/or a binder, in a solvent, applying the mixture on at least one surface of a negative electrode current collector, followed by drying and then roll-pressing, or the negative electrode may be manufactured by casting the negative electrode mixture on a separate support and then laminating, on the negative electrode collector, a film peeled off from the support.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 µm to 500 µm, and as in the case of the positive electrode current collector, microscopic irregularities may be formed on a surface of the negative electrode current collector to improve the adhesion of a negative electrode active material. For example, the negative electrode current collector may be used in various forms such as a film, a sheet, a foil, a net, a porous body, a foam, a non-woven body, and the like.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_v$ ($0<v<2$), $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive agent may be the same as those described above in the description of the positive electrode.

Meanwhile, in the secondary battery, the separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, as the separator, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used as the organic solvent without particular limitation as long as it may serve as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among these solvents, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, when the cyclic carbonate and the chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlClO_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The lithium salt may be used in a concentration range of 0.1 M to 2.0 M. When the concentration of the lithium salt is in the above range, the electrolyte has appropriate conductivity and viscosity, so that excellent electrolyte performance may be exhibited and lithium ions may effectively move.

In the electrolyte, in order to improve the lifespan properties of a battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in addition to the above electrolyte components. At this time, the additive may be included in an amount of 0.1 wt % to 5 wt % based on the total weight of an electrolyte.

As described above, a secondary battery including the positive electrode active material according to the present invention has excellent capacity properties and high-temperature stability properties, and thus, may be usefully applied to portable devices such as a mobile phone, a notebook computer, and a digital camera, and to electric cars such as a hybrid electric vehicle (HEV).

In addition, the secondary battery according to the present invention may be used as a unit cell of a battery module, and the battery module may be applied to a battery pack. The battery module or the battery pack may be used as a power source of at least one medium-and-large sized device such as a power tool; electric cars including an electric vehicle (EV), a hybrid electric vehicle (HEV), and a plug-in hybrid electric vehicle (PHEV); or a power storage system.

MODE FOR CARRYING OUT THE INVENTION

Hereinafter, examples of the present invention will be described in detail so that those skilled in the art can easily carry out the present invention. The present invention may, however, be embodied in many different forms and is not limited to the examples set forth herein.

Example 1

(Preparing Positive Electrode Active Material Precursor)

In a batch-type 5 L reactor set to 60° C., nickel sulfate, cobalt sulfate, manganese sulfate were mixed in water in amounts such that the molar ratio of nickel:cobalt:manganese was 85:11:4 to prepare a metal solution having a concentration of 2 M. Also, a NaOH solution of 4 M and a $NH_4OH$ aqueous solution having a concentration of 7% were prepared.

Thereafter, the prepared metal solution, the NaOH solution, and the $NH_4OH$ aqueous solution were respectively connected to a co-precipitation reactor (capacity 5 L), and 3 liters of deionized water was added to the co-precipitation reactor. Thereafter, nitrogen gas was purged into the reactor at a rate of 2 liters/minute to remove dissolved oxygen in the water, and the inside of the reactor was set to a non-oxidizing atmosphere. Thereafter, 100 ml of NaOH of 4 M was added thereto and stirred at a stirring rate of 1200 rpm at a temperature of 60° C. to maintain a pH of 11.0.

Thereafter, a metal solution, a NaOH aqueous solution, and a $NH_4OH$ aqueous solution were added at rates of 0.38 L/hr, 0.39 L/hr, and 0.05 L/hr, respectively, to be subjected to a co-precipitation reaction for 7 hours so as to precipitate nickel-manganese-cobalt-based composite metal hydroxide particles (average particle diameter $D_{50}$=10 μm).

Thereafter, 3000 ppm of $Co_3O_4$ particles (average particle diameter $D_{50}$=200 nm) and 3000 ppm of $Mn_3O_4$ particles (average particle diameter $D_{50}$=200 nm) were added to the co-precipitation reaction solution, and the reaction was allowed to continue for 2 more hours to prepare a positive electrode active material precursor $Ni_{0.85}Co_{0.11}Mn_{0.04}(OH)_2$ (average particle diameter $D_{50}$=12 μm) having cobalt oxide particles and manganese oxide particles attached thereto.

(Preparing Positive Electrode Active Material)

The precursor prepared above was dry-mixed with lithium hydroxide, followed by firing at 780° C. for 13 hours to prepare a positive electrode active material.

Example 2

A positive electrode active material precursor and a positive electrode active material were prepared in the same manner as in Example 1 except that 1000 ppm of $Co_3O_4$ particles (average particle diameter $D_{50}$=200 nm) and 1000 ppm of $Mn_3O_4$ particles (average particle diameter $D_{50}$=200 nm) were added to the co-precipitation reaction solution.

Comparative Example 1

A positive electrode active material precursor and a positive electrode active material were prepared in the same manner as in Example 1 except that $Co_3O_4$ particles and $Mn_3O_4$ particles were not added.

Comparative Example 2

A positive electrode active material precursor and a positive electrode active material were prepared in the same manner as in Example 1 except that only 3000 ppm of $Co_3O_4$ particles (average particle diameter $D_{50}$=200 nm) were added to the co-precipitation reaction solution.

Comparative Example 3

A positive electrode active material precursor and a positive electrode active material were prepared in the same manner as in Example 1 except that only 3000 ppm of $Mn_3O_4$ particles (average particle diameter $D_{50}$=200 nm) were added to the co-precipitation reaction solution.

Comparative Example 4

A positive electrode active material precursor and a positive electrode active material were prepared in the same manner as in Example 1 except that $MnSO_4$ particles and $CoSO_4$ particles were used instead of $Mn_3O_4$ particles and $Co_3O_4$ particles.

Experimental Example 1

The composition of the positive electrode active material prepared by Example 1 was measured by Electron Probe Micro-Analyze (EPMA) using Focus Ion Beam (Manufacturer: JEOL Co. Model: JXA 8900R).

The measurement results are shown in FIG. 1. As shown in FIG. 1, it can be confirmed that the prepared positive electrode active material has an average composition of $LiNi_{0.83}Co_{0.11}Mn_{0.06}O_2$, the molar fractions of nickel, cobalt, and manganese in the core portion are constant, and the molar fractions of cobalt and manganese in the shell portion are higher than the molar fractions of cobalt and manganese in the core portion.

Experimental Example 2—Evaluation of Heat Flow

The heat flow according to the temperature of the positive electrode active material of each of Examples 1-2 and Comparative Example 1-4 was measured using a differential scanning calorimeter (SETARAM Instrumentation, Sensys evo DSC), Specifically, 16 mg of positive electrode active material was added to a pressure-resistant pen for DSC measurement, and then 20 μL of an electrolyte (EVPS) was injected thereto. The temperature range for the DSC analysis was 25° C. to 400° C. and the temperature elevation rate was 10° C./min. The measurement results are shown in FIG. 2.

Figure 2:
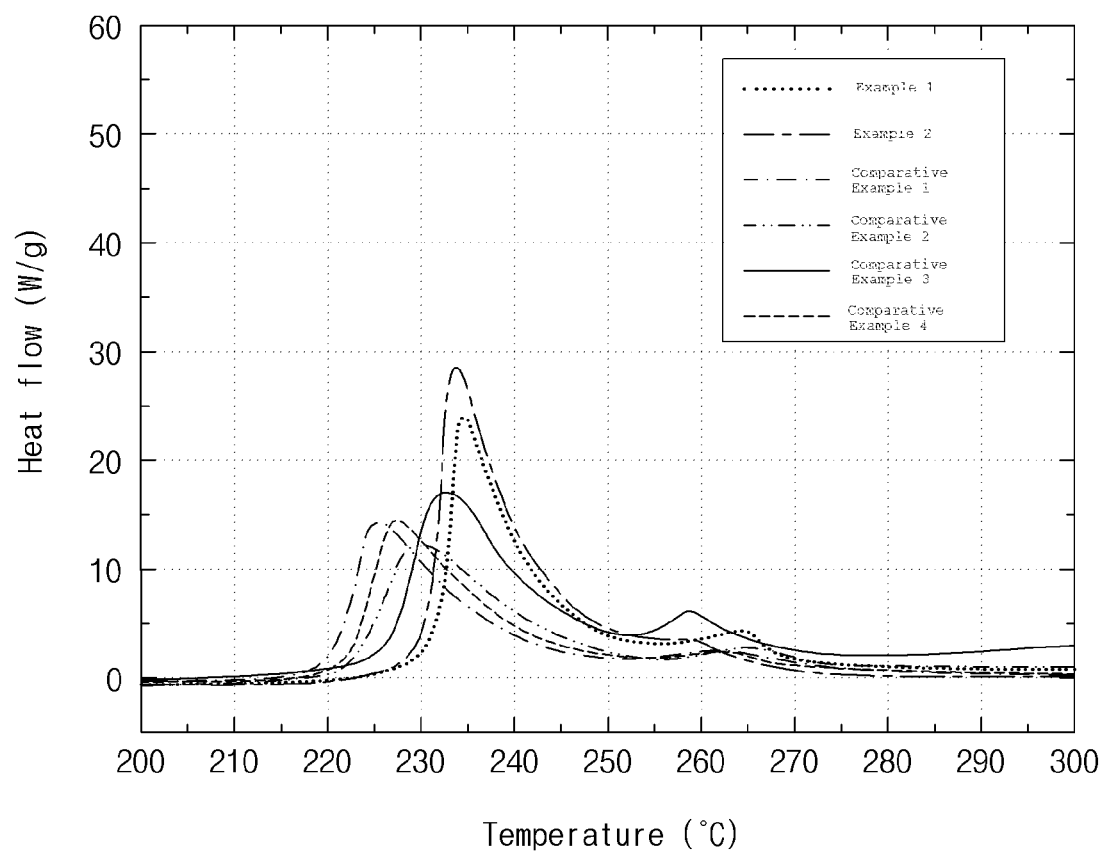
FIG. 2 is a graph showing the heat flow according to the temperature of the positive electrode active material of each of Examples 1-2 and Comparative Example 1-4 measured in Experimental Example 1.

As shown in FIG. 2, the active materials of Examples 1 and 2 have a higher ONSET temperature at which heat generation begins and a higher temperature at which an exothermic peak is formed than the active materials of Comparative Examples 1-4, thereby having excellent high-temperature stability.

Experimental Example 3—Evaluation of Battery Performance

The positive electrode active material prepared in each of Examples 1-2 and Comparative Examples 1-4, a carbon black conductive agent, and a PVdF binder were mixed in an N-methylpyrrolidone solvent at a weight ratio of 96.5:1.5:2.0 to prepare a positive electrode mixture material (viscosity: 5000 mPa·s), and the mixture material was applied on one surface of an aluminum current collector, dried, and roll-pressed to manufacture a positive electrode.

Also, a natural graphite negative electrode active material, a carbon black conductive material, and a PVDF binder were mixed in an N-methylpyrrolidone solvent at a weight ratio of 85:10:5 to prepare a composition for forming a negative electrode active material layer. Then, the composition was applied on one surface of a copper current collector to manufacture a negative electrode.

A porous polyethylene separator was interposed between the positive electrode and the negative electrode which were prepared as described above to prepare an electrode assembly, and then the electrode assembly was placed inside a case. Thereafter, an electrolyte was injected into the case to manufacture a lithium secondary battery. At this time, the electrolyte was prepared by dissolving lithium hexafluorophosphate ($LiPF_6$) of 1.0 M concentration in an organic solvent composed of ethylene carbonate/dimethyl carbonate/ethylmethyl carbonate (mixing volume ratio of EC/DMC/EMC=3/4/3).

Figure 3:
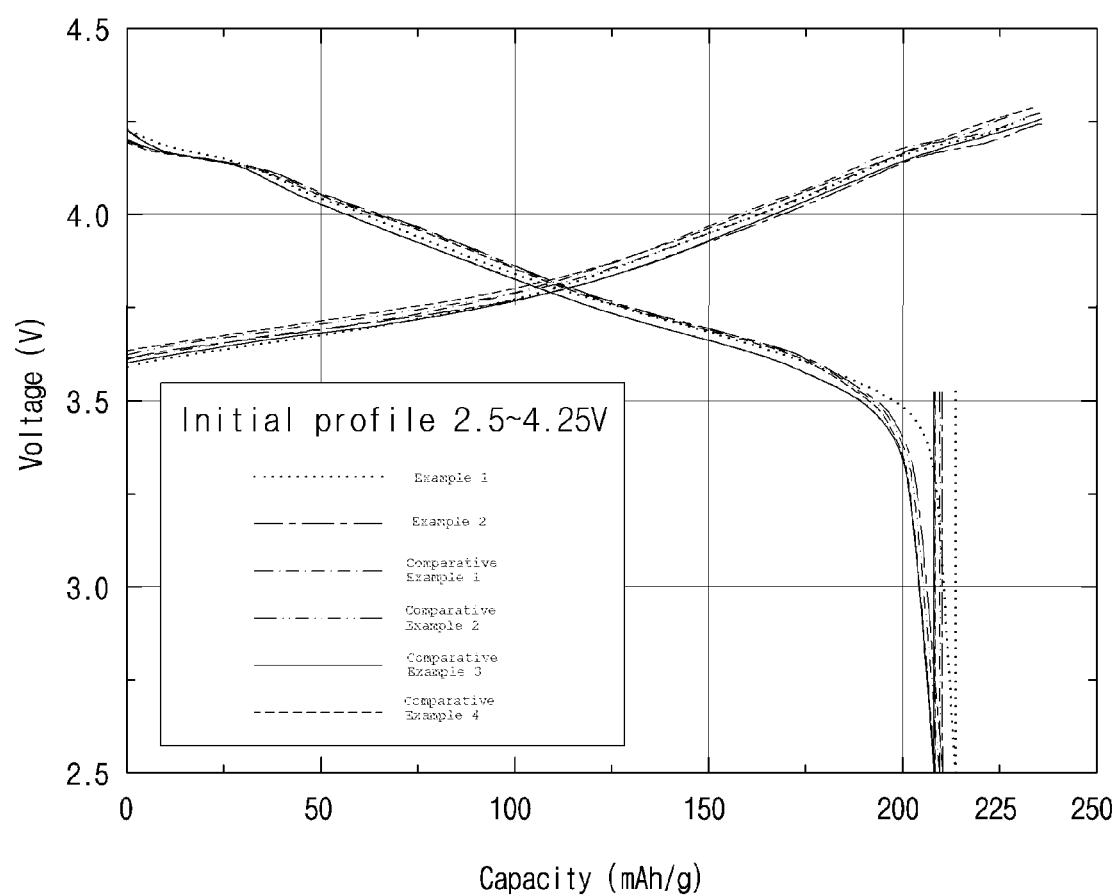
FIG. 3 is a graph showing the initial charge/discharge properties of a secondary battery manufactured by using the positive electrode active material of each of Examples 1-2 and Comparative Examples 1-4.

The lithium secondary battery manufactured as described above was charged/discharged in the voltage range of 2.5 V-4.25 V under the condition described in [Table 1] below to measure discharge capacity (mAh/g). The results are shown in [Table 1] and FIG. 3 below. FIG. 3 is a graph of capacity versus voltage when charging/discharging is performed under the condition of 0.5 C/0.2 C.

TABLE 1

| Charge/discharge conditions | Example 1 | Example 2 | Comparative Example 1 | Comparative Example 2 | Comparative Example 3 | Comparative Example 4 |
|---|---|---|---|---|---|---|
| 0.5 C/0.2 C | 213.5 | 210.3 | 208.2 | 209.5 | 208.1 | 208.4 |
| 0.5 C/0.5 C | 206.8 | 203.3 | 199.1 | 201.1 | 200.2 | 199.6 |
| 0.5 C/1.0 C | 199.3 | 196.4 | 192.3 | 194.4 | 194.5 | 192.8 |
| 0.5 C/1.5 C | 193.1 | 189.6 | 183.2 | 186.2 | 185.4 | 186.4 |
| 0.5 C/2.0 C | 189.5 | 184.3 | 175.7 | 180.2 | 177.4 | 179.3 |

It can be confirmed through [Table 1] and FIG. 3 that the initial discharge capacity of the secondary battery manufactured using the positive electrode active material of Examples 1 and 2 is more excellent that that of the secondary battery manufactured using the positive electrode active material of Comparative Examples 1-4.

The invention claimed is:

1. A positive electrode active material precursor comprising:
   a transition metal hydroxide particle represented by Formula 1 below; and
   a cobalt oxide particle and a manganese oxide particle directly attached to a surface of the transition metal hydroxide particle:

$[Ni_a Co_b M^1_c M^2_d](OH)_2$  [Formula 1]

wherein, $0.8 \leq a < 1$, $0 < b < 0.2$, $0 \leq c \leq 0.1$, and $0 \leq d \leq 0.1$, $M^1$ is one or more selected from the group consisting of Mn and Al, and $M^2$ is one or more selected from the group consisting of Ba, Ca, Zr, Ti, Mg, Ta, Nb, and Mo.

2. The positive electrode active material precursor of claim 1, wherein the positive electrode active material precursor, which includes the transition metal hydroxide particle represented by formula 1, the cobalt oxide particle, and the manganese oxide particle, includes cobalt in an amount of 10-18000 ppm based on a total weight of the positive electrode active material precursor.

3. The positive electrode active material precursor of claim 1, wherein the positive electrode active material precursor, which includes the transition metal hydroxide particle represented by formula 1, the cobalt oxide particle, and the manganese oxide particle, includes manganese in an amount of 10-12000 ppm based on total weight of the positive electrode active material precursor.

4. The positive electrode active material precursor of claim 1, wherein the positive electrode active material precursor, which includes the transition metal hydroxide particle represented by formula 1, the cobalt oxide particle, and the manganese oxide particle, has a weight ratio of cobalt:manganese of 6:4 to 8:2.

5. The positive electrode active material precursor of claim 1, wherein a molar ratio of nickel and cobalt elements in the transition metal hydroxide particle are constant.

* * * * *